United States Patent [19]

Blonder et al.

[11] Patent Number: 5,048,908
[45] Date of Patent: Sep. 17, 1991

[54] METHOD OF PRODUCING APPARATUS COMPRISING A LOW-REFLECTION OPTICAL FIBER CONNECTION

[75] Inventors: Greg E. Blonder, Summit; Bertrand H. Johnson, Murray Hill; Carl R. Paola, Westfield, all of N.J.

[73] Assignee: AT&T Bell Laboratories, Murray Hill, N.J.

[21] Appl. No.: 479,307

[22] Filed: Feb. 13, 1990

[51] Int. Cl.⁵ .............................................. G02B 6/26
[52] U.S. Cl. ................................. 385/39; 225/96.5; 83/913; 385/38
[58] Field of Search ............... 350/96.2, 96.15; 225/2, 225/96.5; 83/913; 29/868, 869

[56] References Cited

U.S. PATENT DOCUMENTS 4,473,942 10/1984 Ridgway .......................... 29/869

OTHER PUBLICATIONS

Saunders; "Torsion Effects on Fractured Fiber Ends"; Applied Optics, vol. 18, No. 10; May 15, 1979; pp. 1480–1481.
Electronic Letters, R. Rao, et al., vol. 22(14) pp. 731–732 (1986).

Primary Examiner—John D. Lee
Assistant Examiner—John Ngo
Attorney, Agent, or Firm—E. E. Pacher

[57] ABSTRACT

It has been discovered that tilted optical fiber endfaces useful in low-reflection optical fiber joints can be produced by cleaving, provided the fiber is twisted through an appropriate twist angle. By way of example, for a particular, commercially available single mode fiber, the normalized twist angle typically is in the range of 5–15 degrees/cm, resulting in a nominal tilt angle of the fiber endface in the approximate range 5–20 degrees.

4 Claims, 2 Drawing Sheets

METHOD OF PRODUCING APPARATUS COMPRISING A LOW-REFLECTION OPTICAL FIBER CONNECTION

FIELD OF THE INVENTION

This invention pertains to the field of optical fiber communications. More particularly, it pertains to apparatus that comprises a low-reflection optical fiber connection or joint, and to methods of producing such a connection.

BACKGROUND OF THE INVENTION

Many optical fiber communication systems comprise semiconductor laser radiation sources. The operation of many of such lasers can be adversely affected if reflected radiation is permitted to impinge on the laser. This is particularly true for such high performance lasers as single mode single frequency lasers used in some current or proposed high bit rate fiber transmission systems. Exemplarily, reflections typically also have to be controlled in 2-way fiber communication links and in multi-channel analog fiber communication systems. Control of reflections thus is an important consideration. See, for instance, R. Rao et al., *Electronics Letters*, Vol. 22(14) pp. 731-732 (1986), incorporated herein by reference.

A known method of preventing significant amounts of reflected power to reach a laser comprises polishing of a fiber end such that the resulting endface is tilted with respect to the fiber axis (ibid), as illustrated schematically in FIG. 1. The Rao reference shows the relationship between the angle of tilt of the fiber endface and the reflected power. For instance, for a tilt angle of 3° the reflected power is about −35 db, and for 5° it is about −45 db.

FIG. 1 shows the relevant portion of a fiber joint 10 between a first fiber 11 and a second fiber 12. Radiation 13 from a laser source propagates towards the joint, with typically a large fraction of the radiant energy entering the second fiber and propagating away from the joint, as indicated by means of arrow 14. The endfaces of the fibers are polished such that a given endface has a tilt angle $\phi$ (preferably $\phi \geq 5°$) relative to the fiber axis. As is the case wherever radiation encounters a discontinuity in refractive index, a part (15) of the radiation is reflected at the first fiber endface, and a part 16 of the radiation is transmitted through the endface and impinges on the second fiber endface, with a portion 17 being reflected, and a portion 14 being guided in the second fiber. For appropriately chosen $\phi$, radiation 15 cannot be guided by fiber 11 and exists from the fiber, as indicated. Furthermore, for an appropriately by chosen tilt angle, radiation 17 does not enter the core of fiber 11.

Fiber-to-fiber joints are not the only fiber joints that can comprise a prior art tilted fiber endface, as is schematically illustrated by FIG. 2. The Figure shows a joint 20 which comprises a semiconductor laser 21, with radiation 23 being emitted from active region 22 and being focussed onto the tilted endface of fiber 26 by spherical lens 24. A portion 27 of incident radiation 25 is reflected at the endface, and portion 28 is propagating in guided fashion away from joint 20 towards some utilization means that is not shown. If the tilt angle of the endface is appropriately chosen, reflected radiation 27 will not be focussed onto 22 and thus does not interfere with system operation.

The above embodiments of fiber joints that comprise at least one tilted endface such as to substantially reduce reflections are exemplary only. Other embodiments are known, and still others may be developed in the future. As those skilled in the art will recognize, not all reflected and/or refracted rays are shown in FIGS. 1 and 2.

A prior art tilted endface is produced by a technique that comprises introducing the fiber into a fixture that has an appropriately tilted polishing surface such that the fiber end extends beyond the polishing surface, possibly breaking the fiber, and removing the portion of the fiber that extends beyond the polishing surface by a, typically conventional, polishing procedure.

Although effective for preventing reflections, the prior art technique of producing a tilted endface by polishing has disadvantages. Among these are substantial cost, the possibility of sub-surface damage, fiber breakage and contamination. In view of these drawbacks it would be desirable to have available a method for producing a tilted endface that is not subject to shortcomings of the prior art technique. This application discloses such a method.

THE INVENTION

It has been discovered that an appropriately tilted fiber endface can be produced by a novel cleaving technique. When fiber with a thus produced tilted endface is part of a fiber joint, then the reflected radiation that is guided by the fiber can be kept to a very small fraction of the incident radiation, exemplarily less than about −35 db, preferably less than −45 db. The inventive cleaving technique can be practiced inexpensively, and does typically not result in significant subsurface damage, inadvertent fiber breakage, or fiber contamination.

In a particular embodiment, the invention is a method of producing apparatus (e.g., a communication system) that comprises a low-reflection optical fiber joint, wherein the method comprises the steps of providing a length of optical fiber, shaping a first end of the optical fiber such that a tilted fiber endface results, incorporating the first end of the optical fiber into the optical fiber joint, and completing producing the apparatus (exemplarily including such steps as coupling a laser to one end of the fiber transmission path that comprises the length of optical fiber and the fiber joint, and/or coupling a detector to the other end).

Significantly, the step of shaping the first end comprises applying a torque to the optical fiber at or near the first end of the fiber such that one end of a portion of the optical fiber is twisted through a predetermined twist angle $\theta$ relative to the other end of the portion, and furthermore comprises cleaving the optical fiber at a point along the portion of the optical fiber. The twist angle is selected such that the resulting tilted endface has a nominal tilt angle $\phi$ of the appropriate size, exemplarily $3° < \phi < 20°$, preferably $\phi \gtrsim 5°$. Typically, a tensile force is also applied to the fiber such that the portion of the fiber is under tensile stress.

Figure 4:
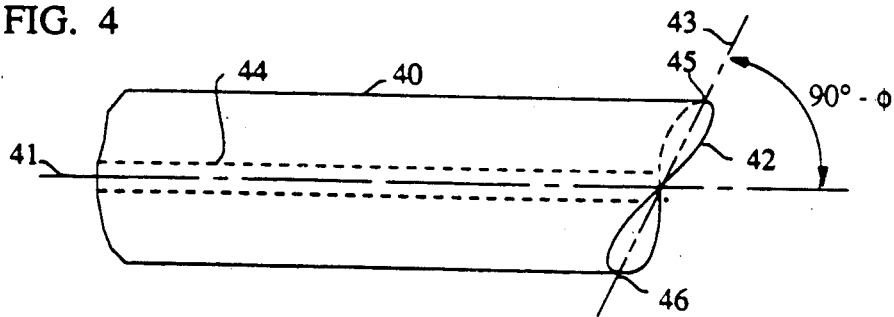
FIG. 4 depicts schematically a cleaved tilted fiber endface according to the invention.

We have found that a predictable relationship exists between the nominal tilt angle of a fiber endface produced according to the invention and the twist angle of the fiber, provided other variables (e.g., parameters such as fiber thickness, and tensile force applied to the fiber) are maintained essentially constant. As expected, the endfaces produced according to the invention typically are not planar but instead are somewhat curved, typically in approximately helical fashion, as is illustrated schematically in FIG. 4. The Figure shows optical fiber 40 which has an axis 41 and a tilted and somewhat curved endface 42. The nominal tilt angle $\phi$ is defined as the complement of the angle between the fiber axis and an imaginary line 43 that runs between the two extreme points of the endface, i.e., between points 45 and 46. The Figure also shows fiber core 44, whose diameter typically is only a small fraction of the fiber diameter. For instance, a widely used single mode fiber has a core diameter of about 8 $\mu$m and fiber diameter of about 125 $\mu$m.

Figure 1:
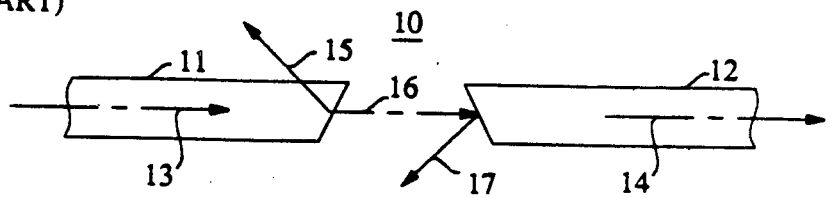
FIGS. 1 and 2 schematically depict exemplary prior art low reflection optical fiber joints.
Figure 2:
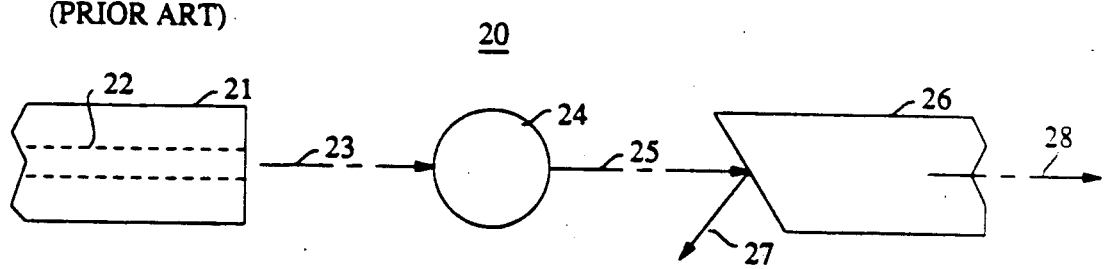

Fiber shaped according to the inventive method can be substituted for prior art fiber with a polished tilted endface in substantially all cases, resulting in considerably reduced cost and other advantages. Thus, FIGS. 1 and 2 would schematically depict inventive fiber joints if the tilted fiber endfaces were not polished endfaces as shown but instead were cleaved.

Strictly speaking, the relevant tilt angle is the tilt angle associated with the core portion of the fiber endface. However, this "core region" tilt angle is relatively difficult to determine. In any case, for the relatively small nominal tilt angles of concern herein the difference between the (readily measurable) nominal tilt angle and the core region tilt angle typically is small.

Figure 3:
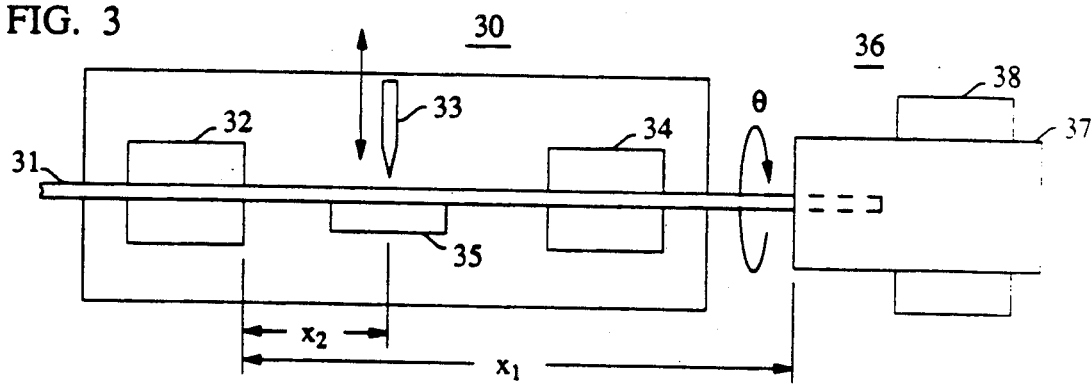
FIG. 3 schematically shows exemplary apparatus that can be used to produce a tilted fiber endface according to the invention.

FIG. 3 schematically depicts exemplary apparatus for the practice of the invention, comprising conventional cleaving means 30 and means 36 for imparting a twist to an end portion of fiber 31. The fiber is clamped in first holding means 32, and the end of the fiber is held in collet 37, which in turn is rotatably held in support means 38. After rotating the collet through an angle $\theta$ about the fiber axis by means that are not shown, second holding means 34 are used to clamp the fiber in position and optionally to apply an appropriate tensile force (typically in the range 50–300 gm, resulting in a tensile stress in 125 $\mu$m fiber in the range 4200–25000 gm/mm²) to the portion of the fiber between 32 and 34. Optional backing means 35 may be used to substantially prevent lateral motion of the fiber when cleaving tool 33 is brought into contact with the fiber. Optionally, the cleaving tool is ultrasonically driven and/or heated in known fashion, and the backing means comprise a semirigid contact material, e.g., silicone rubber. Other contact materials, both less rigid ones and more rigid ones, may also be used. For the relatively small twist angles of interest herein the twist angle at the cleavage point is $(x_2 \theta)/x_1$, wherein $x_1$ and $x_2$ are the indicated distances between holding means 32 and collet 37 and cleaving tool 33, respectively.

Figure 5:
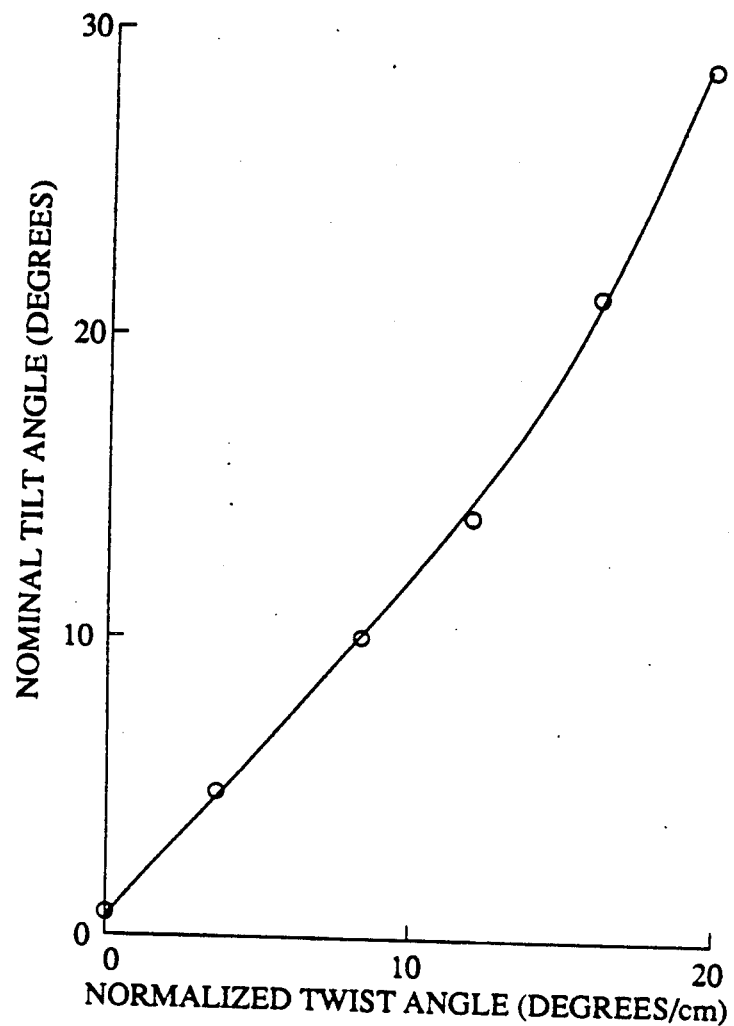
FIG. 5 gives the observed relationship between the normalized twist angle and the nominal tilt angle for a particular set of experimental conditions.

The relationship between twist angle $\theta$ and the resulting nominal tilt angle $\phi$ can be readily determined for a given combination of fiber and cleaving apparatus. Exemplarily, using the cleaving set-up of an appropriately modified commercially available fiber splice set (York FK-11), with an applied tensile force of about 200 gm, the curve of FIG. 5 was obtained for a conventional 125 $\mu$m single mode silica-based optical fiber. The apparatus was substantially as depicted schematically in FIG. 3, with $x_2:x_1$ being about 0.1, and $x_1$ being 10 cm. Thus, $\theta = 90°$ corresponds to a twist of about 9° at the cleave site, which, typically, is about 1–2 cm from holding means 32. For $x_2:x_1 = 0.1$, a given twist angle $\theta$ (as used herein) results in a twist per unit length of fiber of $\theta/10$ degrees/cm, and it is this parameter that is given in FIG. 5, referred to as the "normalized" twist angle.

Figure 6:
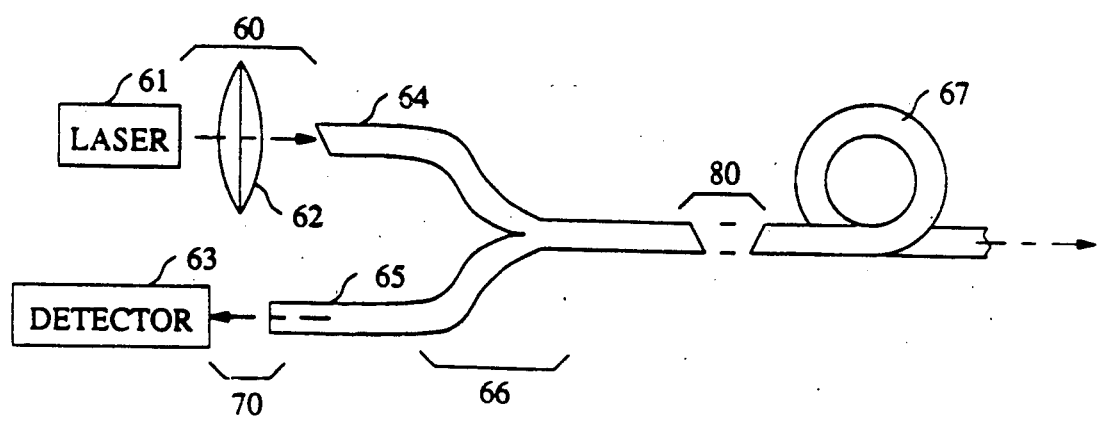
FIG. 6 schematically illustrates exemplary apparatus according to the invention.

FIG. 6 schematically shows a portion of exemplary apparatus according to the invention. In particular, it shows one terminal of a two-way communication system that comprises a single fiber long-haul link 67 to simultaneously carry optical signals in both directions. Inventive fiber joint 60 serves to couple arm 64 of divider 66 to laser 61 and optionally comprises focusing means 62. The end portion of optical fiber 64 comprises a cleaved tilted endface. The terminal also comprises utilization means, e.g. detector 63, which is coupled by conventional fiber joint 70 to the other arm (65) of divider 66, which in turn is coupled by inventive joint 80 to the long-haul fiber 67 of the communication system. A terminal substantially like the depicted terminal is connected to the remote end of 67. The presence of low reflection joint 60 prevents any of the output radiation of laser 61 from being reflected back onto the laser, whereas joint 80 insures that radiation from laser 61 is not reflected back into detector 63.

We claim:

1. Method of producing apparatus that comprises a low-reflection optical fiber joint, the method comprising
    a) providing a length of optical fiber;
    b) shaping a first end of the optical fiber such that a tilted fiber endface results;
    c) incorporating the first end of the optical fiber into the optical fiber joint; and
    d) completing producing the apparatus;
    characterized in that step b) comprises
    applying a torque to the optical fiber at or near the first end such that an end of a portion of the optical fiber is twisted through a predetermined twist angle $\theta$ relative to the other end of the portion, applying a predetermined axial tensile force to the fiber such that the portion of the optical fiber is under axial tensile stress, the tensile stress being greater than about 4200 gm/mm², and contacting the fiber with cleaving means such that the fiber separates at a point along the portion of the optical fiber, the value of $\theta$ selected such that the resulting tilted endface has a nominal tilt angle $\phi$ in the range 3°–20°.

2. Method of claim 1, wherein the apparatus comprises a semiconductor laser, and wherein the fiber joint comprises an optical signal-transmissive connection between the laser and the length of optical fiber.

3. Method of claim 1, wherein the apparatus comprises a semiconductor laser, and wherein the fiber joint comprises an optical signal-transmissive connection between said length of optical fiber and a further length of optical fiber.

4. Method of claim 1, wherein the value of $\theta$ is selected such that reflected optical power is at most $-40$ db of the optical power incident on the endface.

* * * * *